United States Patent
Zhang et al.

(10) Patent No.: US 11,099,275 B1
(45) Date of Patent: Aug. 24, 2021

(54) LIDAR POINT CLOUD REFLECTION INTENSITY COMPLEMENTATION METHOD AND SYSTEM

(71) Applicant: Tsinghua University, Beijing (CN)

(72) Inventors: Xinyu Zhang, Beijing (CN); Zhiwei Li, Beijing (CN); Huaping Liu, Beijing (CN); Yiqian Lu, Beijing (CN); Yuchao Liu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/213,281

(22) Filed: Mar. 26, 2021

(30) Foreign Application Priority Data

Apr. 29, 2020 (CN) .......................... 202010355681.9

(51) Int. Cl.
*G06K 9/00* (2006.01)
*G01S 17/894* (2020.01)
(Continued)

(52) U.S. Cl.
CPC .......... *G01S 17/894* (2020.01); *G01S 7/4808* (2013.01); *G06K 9/4671* (2013.01);
(Continued)

(58) Field of Classification Search
CPC .......................................... G06T 2207/10028
See application file for complete search history.

(56) References Cited

U.S. PATENT DOCUMENTS

| | | |
|---|---|---|
| 2019/0056501 A1 | 2/2019 | Yu et al. |
| 2019/0056502 A1 | 2/2019 | Yu et al. |

(Continued)

FOREIGN PATENT DOCUMENTS

| | | |
|---|---|---|
| CN | 108665496 A | 10/2018 |
| CN | 109798903 A | 5/2019 |

(Continued)

OTHER PUBLICATIONS

E. G. Parmehr, C. S. Fraser, C. Zhang and J. Leach, "Automatic Registration of Aerial Images with 3D LiDAR Data Using a Hybrid Intensity-Based Method," 2012 International Conference on Digital Image Computing Techniques and Applications (DICTA), 2012, pp. 1-7, doi: 10.1109/DICTA.2012.6411697. (Year: 2012).*

(Continued)

*Primary Examiner* — Hadi Akhavannik
(74) *Attorney, Agent, or Firm* — Bayramoglu Law Offices LLC (57) ABSTRACT

A LiDAR point cloud reflection intensity complementation method includes: acquiring a grayscale image and an original point cloud of a same road surface using a calibrated vehicle-mounted webcam and LiDAR; extracting edge information of the grayscale image using a preset edge extraction strategy, to obtain an edge image of the grayscale image; preprocessing the original point cloud to obtain an original point cloud reflection intensity projection image and an interpolated complementary point cloud reflection intensity projection image; and inputting the grayscale image, the edge image of the grayscale image, the original point cloud reflection intensity projection image and the interpolated complementary point cloud reflection intensity projection image into a pre-trained point cloud reflection intensity complementation model, and outputting a complementary point cloud reflection intensity projection image. A LiDAR point cloud reflection intensity complementation system is further provided.

10 Claims, 4 Drawing Sheets

(51) Int. Cl.
  *G01S 7/48*    (2006.01)
  *G06T 7/13*    (2017.01)
  *G06K 9/46*    (2006.01)
  *G06T 7/70*    (2017.01)
  *G06K 9/62*    (2006.01)

(52) U.S. Cl.
  CPC .............. *G06K 9/6265* (2013.01); *G06T 7/13* (2017.01); *G06T 7/70* (2017.01); *G06T 2207/10028* (2013.01); *G06T 2207/20084* (2013.01); *G06T 2207/30252* (2013.01)

(56) References Cited

U.S. PATENT DOCUMENTS

| | | | |
|---|---|---|---|
| 2020/0021847 A1* | 1/2020 | Kim | H04N 19/597 |
| 2020/0105024 A1* | 4/2020 | Mammou | G06T 9/001 |
| 2020/0184718 A1* | 6/2020 | Chiu | G06T 7/33 |

FOREIGN PATENT DOCUMENTS

| | | |
|---|---|---|
| CN | 110827202 A | 2/2020 |
| CN | 110852949 A | 2/2020 |

OTHER PUBLICATIONS

Y. Wang, D. Ewert, D. Schilberg and S. Jeschke, "Edge extraction by merging 3D point cloud and 2D image data," 2013 10th International Conference and Expo on Emerging Technologies for a Smarter World (CEWIT), 2013, pp. 1-6, doi: 10.1109/CEWIT.2013.6713743. (Year: 2013).*

Akin Tatoglu, et al., Point Cloud Segmentation with LIDAR Reflection Intensity Behavior, 2012 IEEE International Conference on Robotics and Automation, May 14-18, 2012, pp. 786-790, USA.

* cited by examiner

LIDAR POINT CLOUD REFLECTION INTENSITY COMPLEMENTATION METHOD AND SYSTEM

CROSS REFERENCE TO THE RELATED APPLICATIONS

This application is based upon and claims priority to Chinese Patent Application No. 202010355681.9, filed on Apr. 29, 2020, the entire contents of which are incorporated herein by reference.

TECHNICAL FIELD

The present invention belongs to the technical field of intelligent driving, in particular to a LiDAR point cloud reflection intensity complementation method and system.

BACKGROUND

Intelligent driving vehicles need to sense and measure the surrounding environment through LiDAR to ensure safe driving, including lane line detection, object detection and tracking, etc. However, the number of scanning lines of LiDAR limits the density of recorded point clouds, and sparse point clouds make high-precision calculation difficult, so sparse point clouds need to be complemented into dense point clouds. The main difficulties of point cloud completion include: 1) the original point clouds are too sparse; and 2) the outdoor scenes lack annotation for neural network supervised learning.

The existing methods mainly aim at the complementation of point cloud depth information, but the point cloud reflection intensity complementation specifically has some difficulties that the depth estimation does not have: 1) the reflection intensity is related to the object material and has little relationship with geometric information, and the reflection intensity of different parts of the same object may be different; and 2) the graphic segmentation labels are not precise enough to be directly used as supervisory labels.

SUMMARY

Aiming at the above technical problem, the present invention provides a LiDAR point cloud reflection intensity complementation method, with the technical solution as follows:

A LiDAR point cloud reflection intensity complementation method includes:

acquiring a grayscale image and an original point cloud of the same road surface using a calibrated vehicle-mounted webcam and LiDAR;

extracting edge information of the grayscale image using a preset edge extraction strategy, to obtain an edge image of the grayscale image;

preprocessing the original point cloud to obtain an original point cloud reflection intensity projection image and an interpolated complementary point cloud reflection intensity projection image; and inputting the grayscale image, the edge image of the grayscale image, the original point cloud reflection intensity projection image and the interpolated complementary point cloud reflection intensity projection image into a pre-trained point cloud reflection intensity complementation model, and outputting a complementary point cloud reflection intensity projection image.

As an improvement of the above method, the extracting edge information of the grayscale image using a preset edge extraction strategy to obtain an edge image of the grayscale image is specifically as follows: extracting the edge information of the grayscale image using a canny operator, and binarizing the obtained edge point set on an image with the same size as the grayscale image, i.e., obtaining the edge image of the grayscale image with the points in the edge point set taking a value of 1 and the remaining points taking a value of 0.

As an improvement of the above method, the preprocessing the original point cloud to obtain an original point cloud reflection intensity projection image and an interpolated complementary point cloud reflection intensity projection image specifically includes:

projecting the original point cloud PC0 from the three-dimensional coordinate system of the LiDAR onto a two-dimensional pixel plane in which the grayscale image is located, to obtain an original point cloud reflection intensity projection image;

extracting a region index of the original point cloud reflection intensity projection image, wherein the region index is a list of coordinate indexes of the image pixels or a binary matrix with the same size as the point cloud projection image, and the region to be complemented takes the value of 1 and the rest of the region takes the value of 0; and performing interpolation on the region to be complemented of the original point cloud reflection intensity projection image, to obtain the interpolated complementary point cloud reflection intensity projection image.

As an improvement of the above method, the projecting the original point cloud PC0 from the three-dimensional coordinate system of the LiDAR onto a two-dimensional pixel plane in which the grayscale image is located to obtain an original point cloud reflection intensity projection image is specifically as follows:

acquiring the conversion matrix $K_1$ of the LiDAR three-dimensional coordinate system and the world three-dimensional coordinate system, and the conversion matrix $K_2$ of the camera two-dimensional imaging coordinate system and the world three-dimensional coordinate system according to calibration parameters;

as to the point P in the world coordinate system, the corresponding three-dimensional coordinate in the world coordinate system is $X_0$, the corresponding three-dimensional coordinate in the radar coordinate system in which the point cloud is located is $X_1$, the two-dimensional coordinate in the camera imaging coordinate system is U, then $U=K_2 \cdot X_0$, $X_1=K_1 \cdot X_0$, therefore, $U=K_2 \cdot K_1^{-1} \cdot X_0$;

intercepting the part at the corresponding position and with the same size of the two-dimensional point cloud image and the grayscale image, with the value of each pixel point being the corresponding reflection intensity value, and then filling the vacant part with the value of 0, so as to convert the LiDAR point cloud into the two-dimensional point cloud image corresponding to the grayscale image, i.e., the original point cloud reflection intensity projection image.

As an improvement of the above method, the performing interpolation on the region to be complemented of the original point cloud reflection intensity projection image to obtain the interpolated complementary point cloud reflection intensity projection image specifically includes:

as to the $i^{th}$ pixel point on the interpolated complementary point cloud reflection intensity projection image, if the value of the $i^{th}$ pixel point in the point cloud reflection intensity projection image is not 0, then three non-zero points $(x_1, y_1)$, ($x_2$, $y_2$), ($x_3$, $y_3$) nearest to the $i^{th}$ pixel point in the point cloud reflection intensity projection image are found, then the complemented value r(i) of the $i^{th}$ pixel point is:

$$r(i) = \frac{1}{3}\sum_{j=1}^{3}\frac{d(i,j)}{\sum_{j=1}^{3}d(i,j)}r(j)$$

$$d(i,j) = \sqrt{(x_i - x_j)^2 + (y_i - y_j)^2}.$$

As an improvement of the above method, the point cloud reflection intensity complementation model is the first SegNet semantic segmentation neural network, and its input includes: the grayscale image, the edge image of the grayscale image, the original point cloud reflection intensity projection image and the interpolated complementary point cloud reflection intensity projection image, and the output is the complementary point cloud reflection intensity projection image; the input grayscale image, the edge image of the grayscale image, the original point cloud reflection intensity projection image and the interpolated complementary point cloud reflection intensity projection image are superimposed into a 4-layer matrix, with each layer having the same size; then each layer is cropped by a preset transformation, and the obtained matrix is I' which is the input to the network; the target output of the network is a single-layer matrix with the same size as I', and the value of each point on it ranges from 0 to 1.

As an improvement of the above method, the method further includes a step of training the point cloud reflection intensity complementation model, specifically including:

acquiring a plurality of sets of grayscale images and the original point cloud of the same road surface for model training, using only the image semantic segmentation labels corresponding to the grayscale images in the input as supervisory labels, wherein the semantic segmentation labels are single-layer matrices of the same size as the corresponding images, with each point on them being an integer value representing the category ordinal number to which the point belongs;

the error $loss_{com}$ of the first SegNet semantic segmentation neural network in the training process satisfies:

$$loss_{com} = loss_{E1} * loss_{E2} * loss_{TV}$$

wherein, $$loss_{E1} = \frac{1}{|C|}\sum_{i\in C}\{[1_E(i)\log(1 - 1_{EN}(i)) + (1 - 1_E(i))\log(1_{EN}(i))]\}$$

$$loss_{E2} = -\frac{1}{|C|}\sum_{c\in nclass}\left(\frac{1}{|c|}\sum_{i\in c\cap C}(i) - \frac{1}{|C|}\sum_{i\in C}(i)\right)^2$$

$$loss_{TV} =$$

$$\frac{1}{|C|}\sum_{i\in C}\sqrt{(\partial_x PCN(i))^2 + (\partial_y PCN(i))^2 + (\partial_x GF(i))^2 + (\partial_y GF(i))^2}$$

wherein, $loss_{E1}$, $loss_{E2}$, $loss_{TV}$ all represent error functions, C represents the set of pixel point indexes in the point cloud complementation region; i is a single pixel point; E represents the set of points on the edge image corresponding to the grayscale image, and EN represents the set of points in the edge image of the complemented point cloud of the target output; $1_E(i)$ is 1 when point i belongs to the set E and corresponds to the edge, and is 0 otherwise. $1_{EN}(i)$ is 1 when point i belongs to the edge of the set EN and is 0 otherwise; |C| is the size of the set of the point cloud to be complemented, nclass represents the set of all the categories in the image segmentation label, c represents a single category in the image segmentation label, i.e., the corresponding set of pixel points; $\Sigma_{i\in c\cap C}(i)$ represents traversing the points belonging to category c in the point cloud to be complemented and taking their reflection intensity values, $\Sigma_{i\in C}(i)$ represents traversing the points to be complemented and taking their reflection intensity values; |c| is the size of the set of points corresponding to category c; PCN(i) represents the reflection intensity values of the points in the complementary point cloud reflection intensity projection image of the target output; GF(i) represents the grayscale values of the pixel points in the grayscale image; $\partial_x PCN(i)$ represents calculating the partial derivative of the x direction by PCN(i), $\partial_y PCN(i)$ represents calculating the partial derivative of the y direction by PCN(i), $\partial_x GF(i)$ represents calculating the partial derivative of the x direction by GF(i), and $\partial_y GF(i)$ represents calculating the partial derivative of the y direction by GF(i);

when the absolute value of the error $loss_{com}$ is less than the preset threshold value or the absolute value of the amplitude is less than the preset threshold value after a certain number of rounds of training, the training is stopped.

As an improvement of the above method, the method further includes a step of training the point cloud reflection intensity complementation model, specifically including:

establishing a point cloud image segmentation model for segmenting the complementary point cloud reflection intensity projection image, wherein the point cloud image segmentation model is a second SegNet semantic segmentation neural network, its input is the complementary point cloud reflection intensity projection image, and the output is the image segmentation result; performing a preset transformation crop on the complementary point cloud reflection intensity projection image, wherein the obtained matrix is I''; using the matrix I'' as the input of the second SegNet semantic segmentation neural network, wherein the target output is a matrix of the same size as I'', representing a plurality of prediction categories; the value range of each point on each layer of channel is 0 to 1, and the sum of the values of the same point on all the layers is 1; and connecting in series the first SegNet semantic segmentation neural network and the second SegNet semantic segmentation neural network into one neural network; and performing joint training.

As an improvement of the above method, the connecting in series the first SegNet semantic segmentation neural network and the second SegNet semantic segmentation neural network into one neural network and performing joint training specifically includes:

acquiring a plurality of sets of grayscale images and the LiDAR original point cloud of the same road surface for model training, using only the image semantic segmentation labels corresponding to the grayscale images as supervisory labels, wherein the semantic segmentation labels are single-layer matrices of the same size as the corresponding images, with each point on them being an integer value representing the category ordinal number to which the point belongs;

the error $loss_{com}$ of the first SegNet semantic segmentation neural network in the training process satisfies:

$$loss_{com} = loss_{E1} * loss_{E2} * loss_{TV}$$

wherein, $$loss_{E1} = \frac{1}{|C|} \sum_{i \in C} \{[1_E(i)\log(1 - 1_{EN}(i)) + (1 - 1_E(i))\log(1_{EN}(i))]\}$$

$$loss_{E2} = -\frac{1}{|C|} \sum_{c \in nclass} \left( \frac{1}{|c|} \sum_{i \in c \cap C} (i) - \frac{1}{|C|} \sum_{i \in C} (i) \right)^2$$

$$loss_{TV} = \frac{1}{|C|} \sum_{i \in C} \sqrt{(\partial_x PCN(i))^2 + (\partial_y PCN(i))^2 + (\partial_x GF(i))^2 + (\partial_y GF(i))^2}$$

wherein, $loss_{E1}$, $loss_{E2}$, $loss_{TV}$ all represent error functions, C represents the set of pixel point indexes in the point cloud complementation region; i is a single pixel point; E represents the set of points on the edge image corresponding to the grayscale image, and EN represents the set of points in the edge image of the complemented point cloud of the target output; $1_E(i)$ is 1 when point i belongs to the set E and corresponds to the edge, and is 0 otherwise. $1_{EN}(i)$ is 1 when point i belongs to the edge of the set EN and is 0 otherwise; |C| is the size of the set of the point cloud to be complemented, nclass represents the set of all the categories in the image segmentation label, c represents a single category in the image segmentation label, i.e., the corresponding set of pixel points; $\Sigma_{i \in c \cap C}(i)$ represents traversing the points belonging to category c in the point cloud to be complemented and taking their reflection intensity values, $\Sigma_{i \in C}(i)$ represents traversing the points to be complemented and taking their reflection intensity values; |c| is the size of the set of points corresponding to category c; PCN(i) represents the reflection intensity values of the points in the complementary point cloud reflection intensity projection image of the target output; GF(i) represents the grayscale values of the pixel points in the grayscale image; $\partial_x PCN(i)$ represents calculating the partial derivative of the x direction by PCN(i), $\partial_y PCN(i)$ represents calculating the partial derivative of the y direction by PCN(i), $\partial_x GF(i)$ represents calculating the partial derivative of the x direction by GF(i), and $\partial_y GF(i)$ represents calculating the partial derivative of the y direction by GF(i);

The error $loss_{seg}$ of the second SegNet semantic segmentation neural network during training satisfies:

$$loss_{seg} = -\frac{1}{|C|} \sum_{i \in C} \sum_{c \in nclass} p_c(i) \log(q_c(i))$$

Wherein, $p_c(i)$ represents the probability of the image segmentation label middle point i belonging to the category c, and $q_c(i)$ represents the probability of the output middle point i of the segmentation network belonging to the category c.

The error loss adopted for the neural network after the series connection is:

$$loss = loss_{com} + loss_{seg}$$

When the absolute value of the error loss is less than the preset threshold value or the absolute value of the amplitude is less than the preset threshold value after a certain number of rounds of training, the training is stopped.

The present invention further provides a LiDAR point cloud reflection intensity complementation system, wherein the system includes a calibrated vehicle-mounted webcam and LiDAR, a data acquisition module, a grayscale image edge extraction module, a point cloud preprocessing module, a trained point cloud reflection intensity complementation model, and a point cloud reflection intensity complementation module, the data acquisition module is configured to acquire grayscale images and LiDAR original point clouds of the same road surface by means of calibrated vehicle-mounted webcam and LiDAR;

the grayscale image edge extraction module is configured to extract edge information of a grayscale image using a preset edge extraction strategy to obtain an edge image of the grayscale image;

the point cloud preprocessing module is configured to preprocess the original point cloud, to obtain the original point cloud reflection intensity projection image and the interpolated complementary point cloud reflection intensity projection image; and the point cloud reflection intensity complementation module is configured to input the grayscale image, the edge image of the grayscale image, the original point cloud reflection intensity projection image and the interpolated complementary point cloud reflection intensity projection image into the pre-trained point cloud reflection intensity complementation model, and output the complementary point cloud reflection intensity projection image.

Compared with the prior art, the present invention has the following advantages:

1. In the method of the present invention, the point cloud is preprocessed firstly to obtain the complementation region, then a neural network is used to fuse both the grayscale image and the point cloud, and an image segmentation network is used to correct the complementary result, thereby making full use of the potential correlation between the LiDAR point cloud and the camera image, so as to effectively and accurately complement the reflection intensity image of the LiDAR point cloud, and improve the effect of the method of complementation based solely on the point cloud;

2. The method of the present invention not only overcomes the problem that in pure point cloud complementation, the point clouds in some regions are too sparse and difficult to be complemented, but also provides the corresponding images as references, thereby increasing the information content and effectively improving the effect of point cloud complementation; and 3. The method of the present invention uses an image segmentation label based on image annotation as a supervisory label for point cloud complementation, which can improve the clarity of the corresponding region on the complemented point cloud; therefore, it can be seen that, the point cloud reflection intensity complementation method provided by the present invention can make full use of the potential association between the point cloud and the image, so as to effectively and accurately complement the reflection intensity image of the LiDAR point cloud.

DETAILED DESCRIPTION OF THE EMBODIMENTS

A clear and complete description will be given below on technical solutions in embodiments of the present invention in combination with accompanying drawings in the embodiments of the present invention. Apparently, the described embodiments are merely part but not all of the embodiments of the present invention. Based on the embodiments in the present invention, all the other embodiments obtained by those skilled in the art without any creative effort shall all fall within the protection scope of the present invention.

Before introducing the embodiments of the present invention, the relevant nouns involved in the embodiments of the present invention are firstly explained as follows:

Point cloud refers to the point data about the appearance surface of an object obtained by measuring instruments such as LiDAR, wherein each point data contains x, y, z coordinates, depth and reflection intensity information.

Grayscale image refers to a grayscale image captured by a grayscale camera as a single channel image.

Two-dimensional point cloud reflection intensity projection image refers to a two-dimensional projection image obtained by projecting the point cloud collected by LiDAR onto the plane in which the grayscale image is located, and its value is the reflection intensity value of the corresponding point in the point cloud.

Label indicates the category label used for supervised training of the image segmentation neural network, and the category of each pixel point is labeled.

Figure 1:
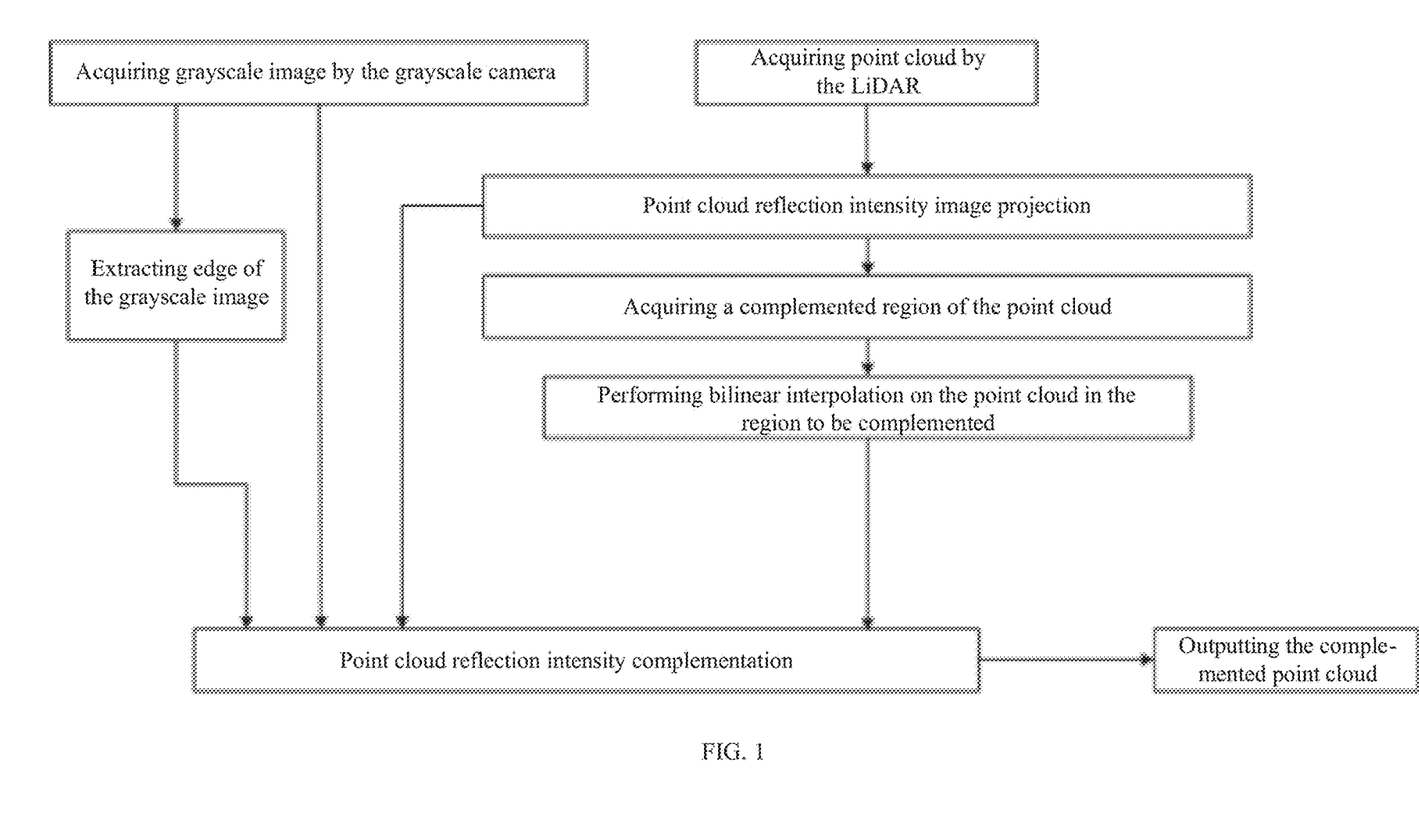
FIG. 1 is a flow diagram of a LiDAR point cloud reflection intensity complementation method provided in embodiment 1 of the present invention.

As shown in FIG. 1, a LiDAR point cloud reflection intensity complementation method of embodiment 1 of the present invention specifically includes the following steps:

step 1) acquiring a grayscale image and LiDAR point cloud of the same road surface, specifically including:

step 101) acquiring a grayscale image GF through a vehicle-mounted grayscale camera;

A forward-facing monocular camera or a forward-facing monocular webcam mounted on a moving vehicle is configured to collect road surface image information. The forward-facing monocular camera acquires the road surface image information directly in front of the driving direction of the driving vehicle and above the road surface. That is, the acquired road surface image information is a perspective view corresponding to the information directly in front of the driving direction of the driving vehicle and above the road surface of the acquired vehicle.

Step 102) acquiring the original point cloud PC0 through vehicle-mounted LiDAR.

In the present embodiment, the road surface image information and the road surface point cloud information are collected synchronously. That is, after LiDAR and forward-facing monocular camera are installed and configured on a moving vehicle, their relative position attitudes are calibrated, meanwhile, road surface data information begins to be collected on the same road surface.

In order to facilitate calculation, the point clouds involved in the following embodiments of the present invention are the parts of the 360° point cloud directly opposite to the front of the vehicle, i.e., the direction in which the image is located. Moreover, since the camera and LiDAR have been calibrated, the conversion matrix of the point cloud projection to the pixel plane can be determined to facilitate the subsequent processing of the point cloud information and image information.

For the calibration of the camera, Zhang's calibration method is adopted, the camera coordinate system and the world coordinate system are firstly set, the imaging of the camera on the tessellation grid at which the camera is placed at a preset position is used to calculate the two-dimensional coordinates of the corner point position of the tessellation grid in the imaging, and then the transformation matrix is calculated with the real three-dimensional coordinates of the corner points of the tessellation grid; for the calibration of the LiDAR, the LiDAR coordinate system and the real world coordinate system are firstly set, a number of obstacles are placed at a preset position and aligned for LiDAR scanning, the coordinates of the point cloud obtained from the obstacles in the LiDAR coordinate system and the coordinates of the obstacles in the real world coordinate system are used to calculate the transformation matrix of the two coordinate systems, the rest of the parameters, including the scanning resolution of the LiDAR, the scanning speed, the time alignment of the LiDAR and the camera and the like can be obtained from their respective hardware information and measurements at the time of installation. The calibration will obtain the interconversion matrix between the world coordinate system and the imaging coordinate system of the camera, and between the world coordinate system and the LiDAR coordinate system.

Step 2) extracting edge information of the grayscale image, to obtain an edge image of the grayscale image.

The edge information E on the grayscale image GF is extracted using a preset edge extraction strategy. In the present embodiment, the edge of the grayscale image GF is extracted using a canny operator, specifically including;

step 201) performing convolution on the original data and the Gaussian smoothing template;

step 202) using four gradient operators to compute the gradients in the horizontal, vertical and diagonal directions, respectively, such that for each point we identify the maximum value at that point and the direction of the generated edge;

step 203) adopting non-maximum suppression: comparing the gradient intensity of the current point with the gradient intensity of the points in the positive and negative gradient directions, if the gradient intensity of the current point is maximum compared with the gradient intensity of other points in the same direction, keeping its value, otherwise setting to 0;

step 204) setting a high threshold value and a low threshold value to filter detected edge; and step 205) hysteresis boundary tracking: searching all the connected weak edges, and if any point of a connected weak edge is connected to a strong edge point, keeping this weak edge, otherwise suppressing this weak edge.

After completing the detection, the edge point set E obtained from detection is binarized on an image of the same size as the grayscale map GF, i.e., the points in the point set E take the value of 1 and the rest of the points take the value of 0, then return to the edge image of this grayscale image, and the edge image is still recorded as E.

Figure 2:
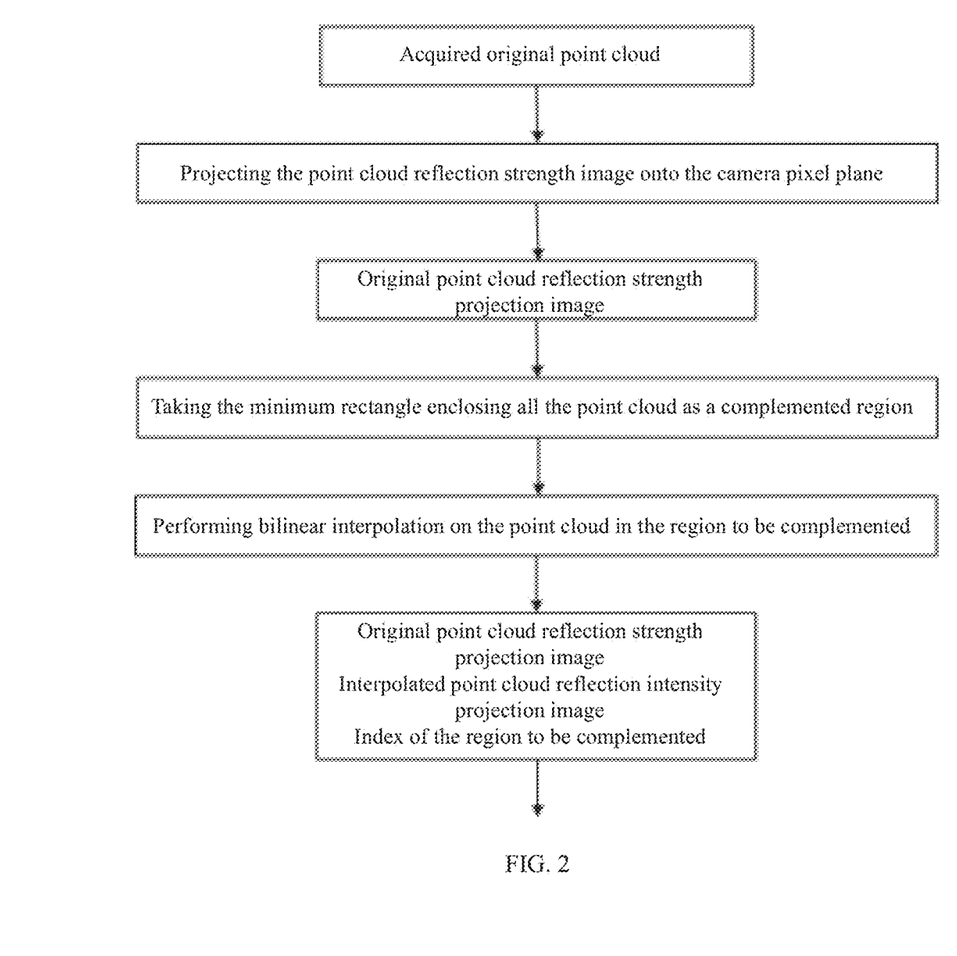
FIG. 2 is a flow diagram of point cloud preprocessing provided in embodiment 1 of the present invention.

Step 3) preprocessing the point cloud, to obtain the point cloud reflection intensity projection diagram;

as shown in FIG. 2, the step specifically includes:

step 301) projecting the point cloud PC0 from the three-dimensional coordinate system of the LiDAR onto the two-dimensional pixel plane in which the grayscale camera image is located, to obtain the point cloud projection image;

specifically, in consideration that the LiDAR and the forward-facing webcam have been calibrated, and the conversion matrix $K_1$ between the LiDAR three-dimensional coordinate system and the world three-dimensional coordinate system, and the conversion matrix $K_2$ between the camera two-dimensional imaging coordinate system and the world three-dimensional coordinate system are obtained according to the calibration parameters. Assume that a point P exists in the world coordinate system, and the corresponding three-dimensional coordinate in the world coordinate system is $X_0$, then the corresponding three-dimensional coordinate in the radar coordinate system where the point cloud is located is $X_1$, and the two-dimensional coordinate in the camera imaging coordinate system is U, then $U=K_2 \cdot X_0$, $X_1=K_1 \cdot X_0$, so $U=K_2 \cdot K_1^{-1} \cdot X_0$. Next, the part at the corresponding position and with the same size of the two-dimensional point cloud image and the grayscale image is intercepted, the value of each pixel point is the corresponding reflection intensity value, and then the vacant part is filled with the value of 0. Therefore, the LiDAR point cloud can be converted into a two-dimensional point cloud image corresponding to the grayscale image, which is still recorded as PC0.

Step 302) extracting the regional index C of the point cloud projection image;

the maximum and minimum values $x_{min}$, $x_{max}$, $y_{min}$, $y_{max}$ of the coordinates of all the point clouds on the x and y axes are taken, and a minimum enclosing rectangle with ($x_{min}$, $y_{min}$), ($x_{max}$, $ymax$) being diagonals can be constructed, such that all the point clouds are exactly enclosed in the rectangle. During specific implementation, exemplarily, C is saved as a list of coordinate indexes of image pixels, or a binary matrix of the same size as the two-dimensional point cloud projection image, wherein the region to be complemented takes the value of 1 and the rest of the region takes the value of 0.

Step 303) interpolating the region to be complemented by the point cloud projection image to obtain an interpolated complementary point cloud reflection intensity projection image;

A nearest neighbor interpolation method is adopted to interpolate the two-dimensional point cloud reflection intensity projection image PC0, to obtain the interpolated complementary point cloud reflection intensity projection image PC1. Wherein for each point i on PC1, if the value of the point in PC0 is not 0, the three non-zero points $(X_1, y_1)$, $(x_2, y_2)$, $(x_3, y_3)$ nearest to the point i in the PC0 are found, then the complementary value of point i is:

$$r(i) = \frac{1}{3} \sum_{j=1}^{3} \frac{d(i,j)}{\sum_{j=1}^{3} d(i,j)} r(j)$$

$$d(i,j) = \sqrt{(x_i - x_j)^2 + (y_i - y_j)^2}$$

The output result of this step is the original point cloud reflection intensity projection image PC0 and the complementary point cloud reflection intensity projection image PC1 obtained by nearest neighbor interpolation method, as well as the point cloud region index C. As mentioned above, C can be a list of indexes, or the corresponding binary matrix.

Step 4) outputting the final complementary point cloud reflection strength projection image through the point cloud reflection strength complementation model;

the original grayscale image GF, the edge image E corresponding to the grayscale image, the original point cloud reflection intensity projection image PC0, and the interpolated complementary point cloud reflection intensity projection image PC1 are used as the input of the point cloud reflection intensity complementation model, and the complementary point cloud reflection intensity projection image PCN is output;

the point cloud reflection intensity complementation model can be any neural network with prediction function, or called semantic segmentation function, image generation function, such as a full convolutional network (FCN), etc. The neural network can be pre-trained or trained based on local data. Wherein in this embodiment, the neural network does not require manual labeling of the ideal complementary point cloud and uses only the image semantic segmentation labels corresponding to the images and grayscale images in the input as supervisory labels. The semantic segmentation labels are single-layer matrices of the same size as the corresponding images, and each point on the semantic segmentation label is an integer value representing the category ordinal number to which the point belongs. An exemplary training flow of the neural network model is described below. Preferably, the SegNet semantic segmentation network is selected.

Two manners are available to train the neural network for point cloud reflection intensity complementation, the first manner is direct training, with the following specific process:

for the preprocessing process, the input size of the network is specified as (512, 256, 4), representing a 4-channel data with the number of pixels on a single channel being (512, 256). For this purpose, the input grayscale image GF, the edge image E corresponding to the grayscale image, the original point cloud reflection intensity two-dimensional projection map PC0, and the interpolated complementary point cloud reflection intensity two-dimensional projection map PC1 are superimposed as a 4-layer matrix, each of which has the same dimension. Then each layer is cropped by a preset transformation to satisfy the input requirements of the network, and the obtained matrix is noted as I'. Subsequently, the matrix I' can be used as the input of the neural network, and the target output PCN of the neural network is a single-layer matrix of the same size as I', with each point on it taking values ranging from 0 to 1.

The error in the neural network model of the complementary point cloud during training satisfies:

$$loss_{com} = loss_{E1} * loss_{E2} * loss_{TV}$$

wherein $$loss_{E1} = \frac{1}{|C|} \sum_{i \in C} \{[1_E(i)\log(1 - 1_{EN}(i)) + (1 - 1_E(i))\log(1_{EN}(i))]\}$$

$$loss_{E2} = -\frac{1}{|C|} \sum_{c \in nclass} \left( \frac{1}{|c|} \sum_{i \in c \cap C} (i) - \frac{1}{|C|} \sum_{i \in C} (i) \right)^2$$

$$loss_{TV} = \frac{1}{|C|} \sum_{i \in C} \sqrt{(\partial_x PCN(i))^2 + (\partial_y PCN(i))^2 + (\partial_x GF(i))^2 + (\partial_y GF(i))^2}$$

wherein, $loss_{E1}$, $loss_{E2}$, $loss_{TV}$ all represent error functions, C represents the set of pixel point indexes in the point cloud complementation region; i is a single pixel point; E represents the set of points on the edge image corresponding to the grayscale image, and EN represents the set of points in the edge image of the complemented point cloud of the target output; $1_E(i)$ is 1 when point i belongs to the set E and corresponds to the edge, and is 0 otherwise. $1_{EN}(i)$ is 1 when point i belongs to the edge of the set EN and is 0 otherwise; |C| is the size of the set of the point cloud to be complemented, nclass represents the set of all the categories in the image segmentation label, c represents a single category in the image segmentation label, i.e., the corresponding set of pixel points; $\Sigma_{i \in c \cap C}(i)$ represents traversing the points belonging to category c in the point cloud to be complemented and taking their reflection intensity values, $\Sigma_{i \in C}(i)$ represents traversing the points to be complemented and taking their reflection intensity values; |c| is the size of the set of points corresponding to category c; PCN(i) represents the reflection intensity values of the points in the complementary point cloud reflection intensity projection image of the target output; GF(i) represents the grayscale values of the pixel points in the grayscale image; $\partial_x PCN(i)$ represents calculating the partial derivative of the x direction by PCN(i), $\partial_y PCN(i)$ represents calculating the partial derivative of the y direction by PCN(i), $\partial_x GF(i)$ represents calculating the partial derivative of the x direction by GF(i), and $\partial_y GF(i)$ represents calculating the partial derivative of the y direction by GF(i);

In view of the fact that those skilled in the art should understand the training process of a neural network model, the training process is described as follows:

The SegNet neural network is implemented based on the tool PyTorch, the aforementioned matrix I' is added to the list of inputs as input, and after setting the size of the encoder and decoder of the network, the number of batch processing, the number of training rounds and other hyperparameters that need to be manually preset, the training starts, the encoder will calculate the hidden vector of the middle layer, and then the decoder will decode the image and extract the edge image EN. After calculating the error loss based on the loss function, the network parameters are updated in the backpropagation step, thereby completing one round of training. When the absolute value of the error is less than the preset threshold value or the absolute value of the amplitude is less than the preset threshold value after a certain number of training rounds, the training can be stopped at this time. It should be noted that the size of the target output of the network is (512, 256, 1).

For the activation function of the neural network, please refer to the structure of SegNet. In the present embodiment, the commonly used Softmax and ReLu are adopted as the activation functions. It should be understood that, other functions can also be substituted herein, but this may have a partial impact on the performance of the neural network. When the neural network has finished training, testing of new images can be started.

The second manner is joint training, with specific process being as follows:

In order to correct the results in step 4), accelerate the convergence of the neural network, and enhance the differentiation of the complementary point cloud PCN for different category regions, a point cloud image segmentation model is designed to segment the complementary point cloud. That is, the PCN of the complementary point cloud reflection intensity two-dimensional projection image is used as the input of the point cloud image segmentation model, and the output is the image segmentation result.

The point cloud image segmentation model can be any neural network with prediction function, or called semantic segmentation function, image generation function, such as a full convolutional network (FCN), etc. The neural network can be pre-trained or trained based on local data and uses the image semantic segmentation labels described in step 4) as supervisory labels. Exemplarily, the values on the labels are assumed to be 10 integers from 0 to 9. Preferably, the SegNet semantic segmentation network is selected for this neural network.

For the preprocessing process, the input size of the network is specified as (512, 256, 1). To this end, a preset transformation crop is performed on the PCN to satisfy the input requirements of the network, and the obtained matrix is recorded as I''. In the present embodiment, the transformation crop can be avoided since the PCN has the same dimension as I''. Subsequently, the matrix I'' is taken as the input of the neural network, and the target output of the neural network is a 10-layer matrix of the same size as I''', representing 10 prediction categories. The values of each point on each layer of channel range from 0 to 1, and the sum of the values of the same point on the 10 layers is 1.

The error in the training process of the neural network used for point cloud image segmentation satisfies:

$$\text{loss}_{seg} = -\frac{1}{|C|} \sum_{i \in C} \sum_{c \in nclass} p_c(i) \log(q_c(i))$$

Wherein, $p_c(i)$ represents the probability of the image segmentation label middle point i belonging to the category c, and $q_c(i)$ represents the probability of the output middle point i which segments the network belonging to the category c.

In the training process, the neural network configured to complement the point cloud reflection intensity and the neural network used for point cloud image segmentation are connected in series into one neural network (also known as "end-to-end training") with the following error function:

$$\text{loss} = \text{loss}_{com} + \text{loss}_{seg}$$

Figure 3:
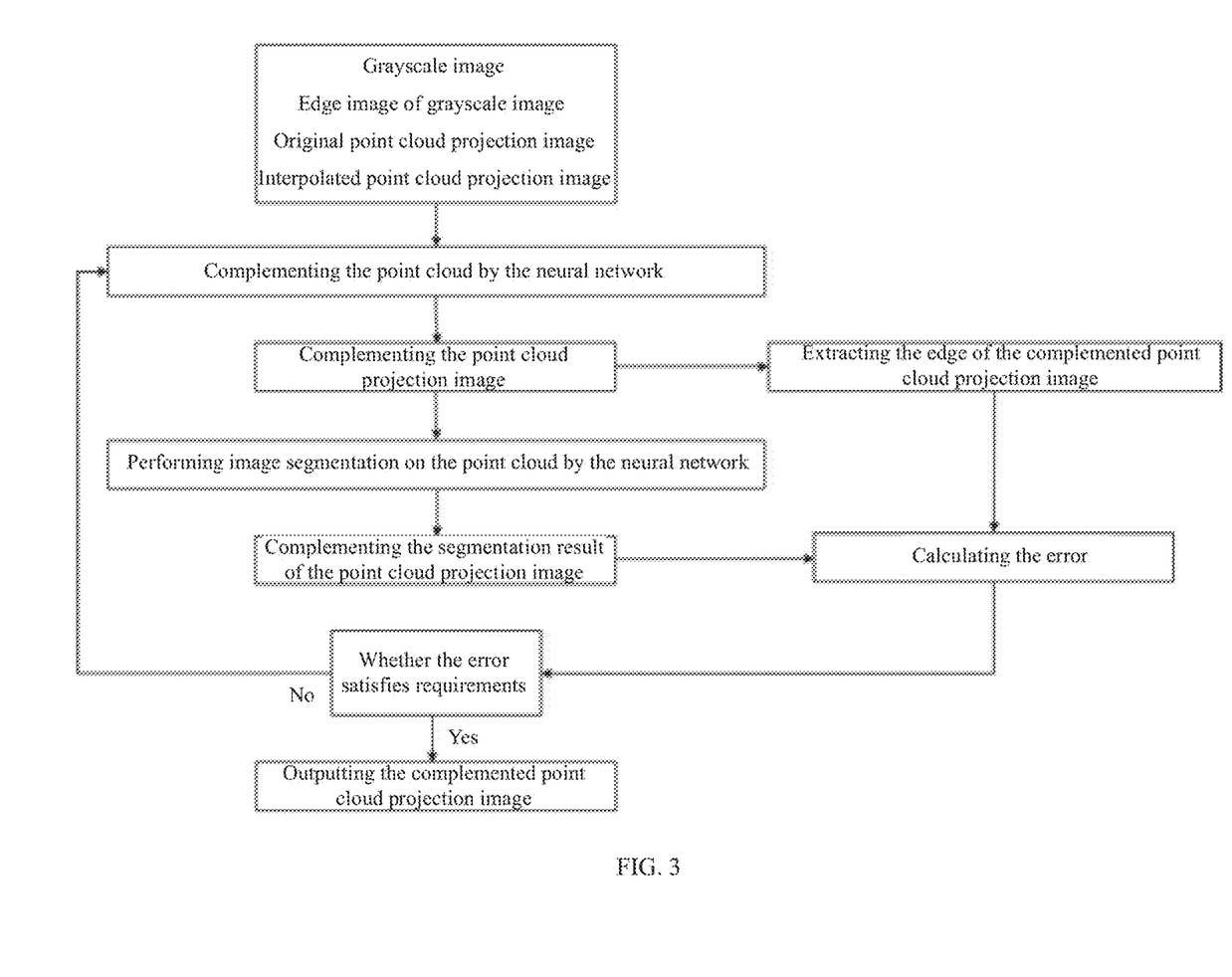
FIG. 3 is a flow chart of training the point cloud reflection intensity complementation model by the point cloud image segmentation provided in embodiment 1 of the present invention.

As shown in FIG. 3, two SegNet neural networks are implemented and connected in series based on the tool PyTorch, and the aforementioned matrix I' is added to the list of inputs as the input of the first SegNet network, and the target output PCN is obtained after completing one forward-facing propagation, and the edge image EN is extracted. Next, the PCN is converted to the input I'' of the second SegNet network, and after one forward-facing propagation, image segmentation is performed on the point cloud; the error is calculated according to the above loss function=l=$\text{loss}_{com}$+$\text{loss}_{seg}$, and the parameters of the two networks are updated in the backward propagation step, thereby completing one round of training. When the absolute value of the error is less than the preset threshold value or when the absolute value of the amplitude is less than the preset threshold value after a certain number of rounds of training, the training can be stopped at this time. It should be noted that the size of the target output of the first SegNet network is (512, 256, 1), and the size of the target output of the second SegNet network is (512, 256, 10).

For the activation function of the neural network, with reference to the structure of SegNet, in the present embodiment, the commonly used Softmax and ReLu are adopted as the activation functions. It should be understood that other functions can also be substituted herein, but this may have a partial impact on the performance of the neural network. When the neural network has finished training, testing of new images can be started.

Embodiment 2

Figure 4:
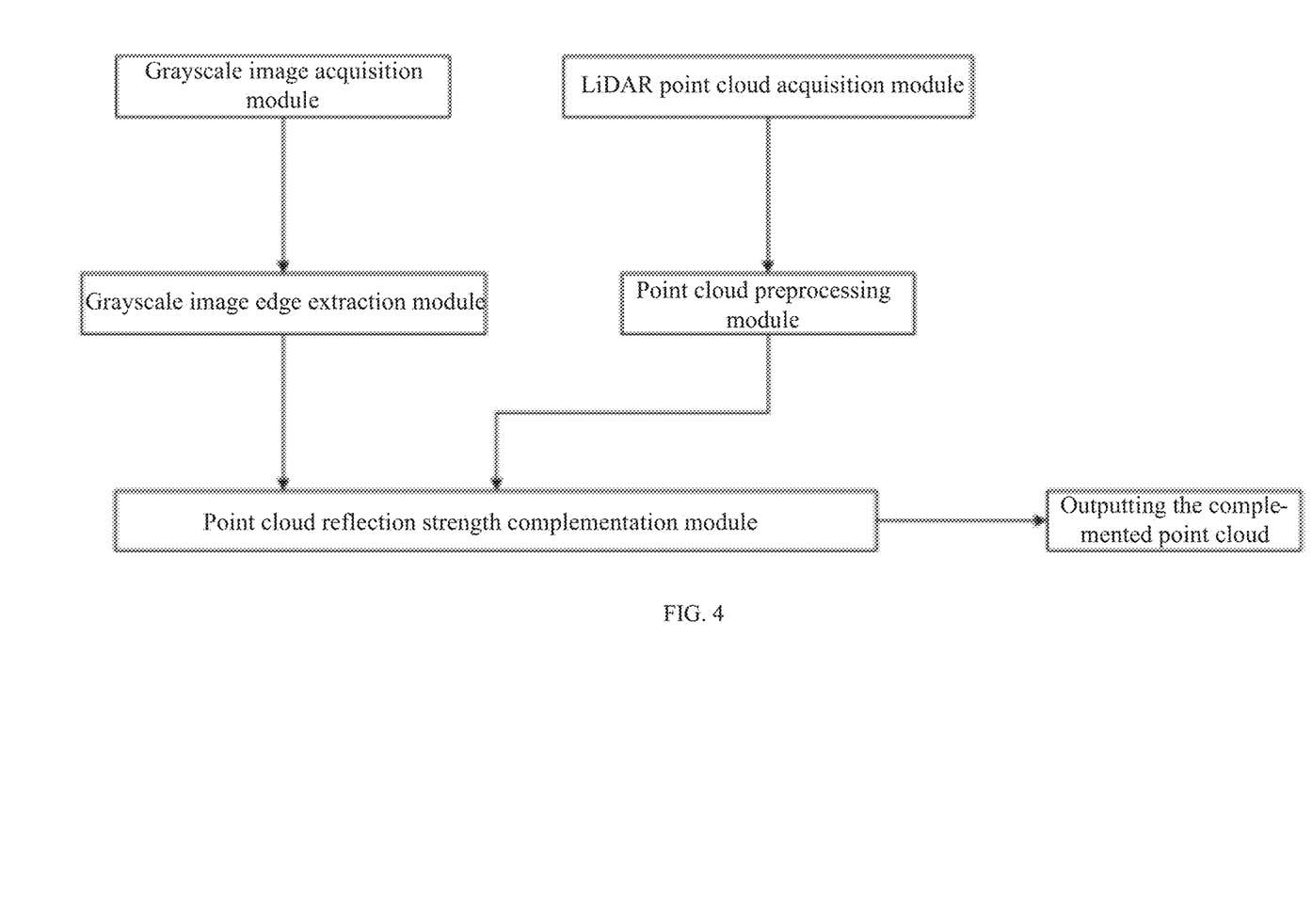
FIG. 4 is a schematic diagram of a LiDAR point cloud reflection intensity complementation system provided in embodiment 2 of the present invention.

As shown in FIG. 4, embodiment 2 of the present invention provides a LiDAR point cloud reflection intensity complementation system, including: a calibrated vehicle-mounted webcam and LiDAR, a grayscale image acquisition module, a LiDAR point cloud acquisition module, a grayscale image edge extraction module, a point cloud preprocessing module, a trained point cloud reflection intensity complementation model, and a point cloud reflection intensity complementation module, wherein the grayscale image acquisition module is configured to acquire grayscale images by means of calibrated vehicle-mounted webcam;

the LiDAR point cloud acquisition module is configured to acquire the original point cloud of the same road surface by means of LiDAR;

the grayscale image edge extraction module is configured to extract edge information of the grayscale image using a preset edge extraction strategy, to obtain an edge image of the grayscale image;

the point cloud preprocessing module is configured to preprocess the original point cloud to obtain an original point cloud reflection intensity projection image and an interpolated complementary point cloud reflection intensity projection image; and the point cloud reflection intensity complementation module is configured to input the grayscale image, the edge image of the grayscale image, the original point cloud reflection intensity projection image and the interpolated complementary point cloud reflection intensity projection image into a pre-trained point cloud reflection intensity complementation model, and output a complementary point cloud reflection intensity projection image.

Those skilled in the art can realize that the units and algorithmic steps of various examples described in conjunction with the embodiments disclosed herein are capable of being implemented in electronic hardware, or a combination of computer software and electronic hardware. Whether these functions are performed in hardware or software depends on the particular application and design constraints of the technical solution. The professionals may use different methods to implement the described functions for each particular application, but such implementations should not be considered to go beyond the scope of the present invention.

Finally, it should be noted that, the above embodiments are merely used for illustrating rather than limiting the technical solution of the present invention. Although the present invention is described in detail with reference to the embodiments, those skilled in the art should understand that any modification or equivalent substitution made to the technical solution of the present invention shall not depart from the spirit and scope of the technical solution of the present invention, and shall be encompassed within the scope of the claims of the present invention.

What is claimed is:

1. A LiDAR point cloud reflection intensity complementation method, comprising:
    acquiring a grayscale image and an original point cloud of a same road surface using a calibrated vehicle-mounted webcam and LiDAR;
    extracting edge information of the grayscale image using a preset edge extraction strategy, to obtain an edge image of the grayscale image;
    preprocessing the original point cloud to obtain an original point cloud reflection intensity projection image and an interpolated complementary point cloud reflection intensity projection image; and
    inputting the grayscale image, the edge image of the grayscale image, the original point cloud reflection intensity projection image and the interpolated complementary point cloud reflection intensity projection image into a pre-trained point cloud reflection intensity complementation model, and outputting a complementary point cloud reflection intensity projection image.

2. The LiDAR point cloud reflection intensity complementation method of claim 1, wherein the step of extracting the edge information of the grayscale image using the preset edge extraction strategy to obtain the edge image of the grayscale image comprises: extracting the edge information of the grayscale image using a canny operator, and binarizing an obtained edge point set on an image with a same size as the grayscale image, i.e., obtaining the edge image of the grayscale image with points in the edge point set taking a value of 1 and remaining points taking a value of 0.

3. The LiDAR point cloud reflection intensity complementation method of claim 1, wherein the step of preprocessing the original point cloud to obtain the original point cloud reflection intensity projection image and the interpolated complementary point cloud reflection intensity projection image specifically comprises:
    projecting the original point cloud PC0 from a three-dimensional coordinate system of the LiDAR onto a two-dimensional pixel plane in which the grayscale image is located, to obtain the original point cloud reflection intensity projection image;
    extracting a region index of the original point cloud reflection intensity projection image, wherein the region index is a list of coordinate indexes of image pixels or a binary matrix with a same size as a point cloud projection image, and a region to be complemented takes a value of 1 and a rest of the region takes a value of 0; and
    performing interpolation on the region to be complemented of the original point cloud reflection intensity projection image, to obtain the interpolated complementary point cloud reflection intensity projection image.

4. The LiDAR point cloud reflection intensity complementation method of claim 3, wherein the step of projecting the original point cloud PC0 from the three-dimensional coordinate system of the LiDAR onto the two-dimensional pixel plane in which the grayscale image is located to obtain the original point cloud reflection intensity projection image specifically comprises:
    acquiring a conversion matrix $K_1$ of the LiDAR three-dimensional coordinate system and a world three-dimensional coordinate system, and a conversion matrix $K_2$ of a camera two-dimensional imaging coordinate system and the world three-dimensional coordinate system according to calibration parameters;
    as to a point P in the world three-dimensional coordinate system, a corresponding three-dimensional coordinate in the world three-dimensional coordinate system is $X_0$, a corresponding three-dimensional coordinate in a radar coordinate system in which a point cloud is located is $X_1$, a two-dimensional coordinate in the camera two-dimensional imaging coordinate system is U, then $U=K_2 \cdot X_0$, $X_1=K_1 \cdot X_0$, therefore, $U=K_2 \cdot K_1^{-1} \cdot X_0$; and
    intercepting a part at a corresponding position and with a same size of a two-dimensional point cloud image and the grayscale image, with a value of each pixel point being a corresponding reflection intensity value, and then filling a vacant part with a value of 0, so as to convert the LiDAR point cloud into the two-dimensional point cloud image corresponding to the grayscale image, i.e., the original point cloud reflection intensity projection image.

5. The LiDAR point cloud reflection intensity complementation method of claim 4, wherein the step of performing interpolation on the region to be complemented of the original point cloud reflection intensity projection image to obtain the interpolated complementary point cloud reflection intensity projection image specifically comprises:

as to an $i^{th}$ pixel point on the interpolated complementary point cloud reflection intensity projection image, when a value of the $i^{th}$ pixel point in the point cloud reflection intensity projection image is not 0, then three non-zero points $(x_1, y_1)$, $(x_2, y_2)$, $(x_3, y_3)$ nearest to the $i^{th}$ pixel point in the point cloud reflection intensity projection image are found, then a complemented value $r(i)$ of the $i^{th}$ pixel point is:

$$r(i) = \frac{1}{3}\sum_{j=1}^{3} \frac{d(i,j)}{\sum_{j=1}^{3} d(i,j)} r(j);$$

$$d(i,j) = \sqrt{(x_i - x_j)^2 + (y_i - y_j)^2}.$$

6. The LiDAR point cloud reflection intensity complementation method of claim 5, wherein a point cloud reflection intensity complementation model is a first SegNet semantic segmentation neural network, and its input comprises the grayscale image, the edge image of the grayscale image, the original point cloud reflection intensity projection image and the interpolated complementary point cloud reflection intensity projection image, and the output is the complementary point cloud reflection intensity projection image; the input grayscale image, the edge image of the grayscale image, the original point cloud reflection intensity projection image and the interpolated complementary point cloud reflection intensity projection image are superimposed into a 4-layer matrix, with each layer having a same size; then the each layer is cropped by a preset transformation, and an obtained matrix is I' which is the input to the network; a target output of the network is a single-layer matrix with a same size as I', and a value of each point on the single-layer matrix ranges from 0 to 1.

7. The LiDAR point cloud reflection intensity complementation method of claim 6, further comprising: a step of training the point cloud reflection intensity complementation model, specifically comprising:

acquiring a plurality of sets of grayscale images and the original point cloud of the same road surface for model training, using only image semantic segmentation labels corresponding to the grayscale images in the input as supervisory labels, wherein the semantic segmentation labels are single-layer matrices with a same size as the corresponding images, with each point on them being an integer value representing the category ordinal number to which the point belongs;

an error $loss_{com}$ of the first SegNet semantic segmentation neural network in a training process satisfies:

$$loss_{com} = loss_{E1} * loss_{E2} * loss_{TV};$$

wherein $$loss_{E1} = \frac{1}{|C|}\sum_{i \in C}\{[1_E(i)\log(1 - 1_{EN}(i)) + (1 - 1_E(i))\log(1_{EN}(i))]\};$$

$$loss_{E2} = -\frac{1}{|C|}\sum_{c \in nclass}\left(\frac{1}{|c|}\sum_{i \in c \cap C}(i) - \frac{1}{|C|}\sum_{i \in C}(i)\right)^2;$$

$$loss_{TV} = \frac{1}{|C|}\sum_{i \in C} \sqrt{(\partial_x PCN(i))^2 + (\partial_y PCN(i))^2 + (\partial_x GF(i))^2 + (\partial_y GF(i))^2};$$

wherein, $loss_{E1}$, $loss_{E2}$, $loss_{TV}$ all represent error functions, C represents a set of pixel point indexes in a point cloud complementation region; i is a single pixel point; E represents a set of points on the edge image corresponding to the grayscale image, and EN represents the set of points in the edge image of the complemented point cloud of the target output; $1_E(i)$ is 1 when point i belongs to the set E and corresponds to the edge, and is 0 otherwise; $1_{EN}(i)$ is 1 when point i belongs to the edge of the set EN and is 0 otherwise; |C| is a size of the set of the point cloud to be complemented; nclass represents a set of all categories in an image segmentation label; c represents a single category in the image segmentation label, i.e., the corresponding set of pixel points; $\Sigma_{i \in c \cap C}(i)$ represents traversing the points belonging to the single category c in the point cloud to be complemented and taking their reflection intensity values; $\Sigma_{i \in C}(i)$ represents traversing the points to be complemented and taking their reflection intensity values; |c| is a size of a set of points corresponding to the single category c; PCN(i) represents reflection intensity values of the points in the complementary point cloud reflection intensity projection image of the target output; GF(i) represents grayscale values of the pixel points in the grayscale image; $\partial_x PCN(i)$ represents calculating a partial derivative of an x direction by PCN(i), $\partial_y PCN(i)$ represents calculating a partial derivative of a y direction by PCN(i), $\partial_x GF(i)$ represents calculating a partial derivative of the x direction by GF(i), and $\partial_y GF(i)$ represents calculating a partial derivative of the y direction by GF(i);

when an absolute value of the error $loss_{com}$ is less than a preset threshold value or an absolute value of an amplitude is less than the preset threshold value after a certain number of rounds of training, the training process is stopped.

8. The LiDAR point cloud reflection intensity complementation method of claim 6, further comprising: a step of training the point cloud reflection intensity complementation model, specifically comprising:

establishing a point cloud image segmentation model for segmenting the complementary point cloud reflection intensity projection image, wherein the point cloud image segmentation model is a second SegNet semantic segmentation neural network, its input is the complementary point cloud reflection intensity projection image, and the output is an image segmentation result; performing a preset transformation crop on the complementary point cloud reflection intensity projection image, wherein an obtained matrix is I"; using the matrix I" as the input of the second SegNet semantic segmentation neural network, wherein the target output is a matrix with a same size as I″, representing a plurality of prediction categories; the value range of each point on each layer of channel is 0 to 1, and the sum of the values of a same point on all the layers is 1; and connecting in series the first SegNet semantic segmentation neural network and the second SegNet semantic segmentation neural network into one neural network; and performing joint training.

9. The LiDAR point cloud reflection intensity complementation method of claim 8, wherein the step of connecting in series the first SegNet semantic segmentation neural network and the second SegNet semantic segmentation neural network into one neural network and performing joint training specifically comprises:

acquiring a plurality of sets of grayscale images and the LiDAR original point cloud of the same road surface for model training, using only image semantic segmentation labels corresponding to grayscale images as supervisory labels, wherein the semantic segmentation labels are single-layer matrices with a same size as the corresponding images, with each point on them being an integer value representing the category ordinal number to which the point belongs;

an error loss$_{com}$ of the first SegNet semantic segmentation neural network in a training process satisfies:

$$\text{loss}_{com} = \text{loss}_{E1} * \text{loss}_{E2} * \text{loss}_{TV};$$

wherein, $$\text{loss}_{E1} = \frac{1}{|C|} \sum_{i \in C} \{[1_E(i)\log(1 - 1_{EN}(i)) + (1 - 1_E(i))\log(1_{EN}(i))]\};$$

$$\text{loss}_{E2} = -\frac{1}{|C|} \sum_{c \in nclass} \left( \frac{1}{|c|} \sum_{i \in c \cap C} (i) - \frac{1}{|C|} \sum_{i \in C} (i) \right)^2;$$

$$\text{loss}_{TV} = \frac{1}{|C|} \sum_{i \in C} \sqrt{(\partial_x PCN(i))^2 + (\partial_y PCN(i))^2 + (\partial_x GF(i))^2 + (\partial_y GF(i))^2};$$

wherein, loss$_{E1}$, loss$_{E2}$, loss$_{TV}$ all represent error functions, C represents a set of pixel point indexes in a point cloud complementation region; i is a single pixel point; E represents a set of points on the edge image corresponding to the grayscale image, and EN represents the set of points in the edge image of the complemented point cloud of the target output; $1_E(i)$ is 1 when point i belongs to the set E and corresponds to the edge, and is 0 otherwise; $1_{EN}(i)$ is 1 when point i belongs to the edge of the set EN and is 0 otherwise; |C| is a size of the set of the point cloud to be complemented; nclass represents a set of all categories in an image segmentation label; c represents a single category in the image segmentation label, i.e., the corresponding set of pixel points; $\Sigma_{i \in c \cap C}(i)$ represents traversing the points belonging to the single category c in the point cloud to be complemented and taking their reflection intensity values; $\Sigma_{i \in C}(i)$ represents traversing the points to be complemented and taking their reflection intensity values; |c| is a size of a set of points corresponding to the single category c; PCN(i) represents reflection intensity values of the points in the complementary point cloud reflection intensity projection image of the target output; GF(i) represents grayscale values of the pixel points in the grayscale image; $\partial_x PCN(i)$ represents calculating a partial derivative of an x direction by PCN(i), $\partial_y PCN(i)$ represents calculating a partial derivative of a y direction by PCN(i), $\partial_x GF(i)$ represents calculating a partial derivative of the x direction by GF(i), and $\partial_y GF(i)$ represents calculating a partial derivative of the y direction by GF(i);

an error loss$_{seg}$ of the second SegNet semantic segmentation neural network in the training process satisfies:

$$\text{loss}_{seg} = -\frac{1}{|C|} \sum_{i \in C} \sum_{c \in nclass} p_c(i)\log(q_c(i));$$

wherein, $p_c(i)$ represents a probability of an image segmentation label middle point i belonging to the category c, and $q_c(i)$ represents a probability of an output middle point i of the segmentation network belonging to the category c;

an error loss adopted for the neural network after the series connection is:

$$\text{loss} = \text{loss}_{com} + \text{loss}_{seg};$$

when an absolute value of the error loss is less than a preset threshold value or an absolute value of an amplitude is less than the preset threshold value after a certain number of rounds of training, the training process is stopped.

10. A LiDAR point cloud reflection intensity complementation system, comprising a calibrated vehicle-mounted webcam and LiDAR, a data acquisition module, a grayscale image edge extraction module, a point cloud preprocessing module, a trained point cloud reflection intensity complementation model, and a point cloud reflection intensity complementation module; wherein, the data acquisition module is configured to acquire grayscale images and LiDAR original point clouds of a same road surface by means of calibrated vehicle-mounted webcam and LiDAR;

the grayscale image edge extraction module is configured to extract edge information of a grayscale image using a preset edge extraction strategy to obtain an edge image of the grayscale image;

the point cloud preprocessing module is configured to preprocess the original point cloud, to obtain the original point cloud reflection intensity projection image and the interpolated complementary point cloud reflection intensity projection image; and the point cloud reflection intensity complementation module is configured to input the grayscale image, the edge image of the grayscale image, the original point cloud reflection intensity projection image and the interpolated complementary point cloud reflection intensity projection image into a pre-trained point cloud reflection intensity complementation model, and output a complementary point cloud reflection intensity projection image.

\* \* \* \* \*